United States Patent
Olsen et al.

(10) Patent No.: US 9,312,998 B2
(45) Date of Patent: Apr. 12, 2016

(54) FILTER-BASED GUARDBAND DETERMINATION AND SUBCARRIER SELECTION

(71) Applicant: T-Mobile USA, Inc., Bellevue, WA (US)

(72) Inventors: Brian Allan Olsen, Bellevue, WA (US); Pablo Tapia, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 107 days.

(21) Appl. No.: 14/042,510

(22) Filed: Sep. 30, 2013

(65) Prior Publication Data

US 2015/0092677 A1    Apr. 2, 2015

(51) Int. Cl.
*H04L 5/00* (2006.01)

(52) U.S. Cl.
CPC ............ *H04L 5/0044* (2013.01); *H04L 5/0066* (2013.01); *H04L 5/0007* (2013.01)

(58) Field of Classification Search
CPC ................... H04L 2025/03414; H04W 88/08; H04B 1/10; H04B 1/1081
See application file for complete search history.

(56) References Cited

U.S. PATENT DOCUMENTS

| | | | |
|---|---|---|---|
| 7,289,480 B2 * | 10/2007 | Lundstrom et al. | 370/338 |
| 7,944,995 B2 | 5/2011 | Skarby et al. | |
| 8,223,700 B2 | 7/2012 | Ding et al. | |
| 2011/0092171 A1 * | 4/2011 | Delforce | 455/90.2 |
| 2011/0129047 A1 | 6/2011 | Mashino et al. | |

OTHER PUBLICATIONS

PCT Search Report and Written Opinion mailed Dec. 5, 2014 for PCT application No. PCT/US14/54586, 11 pages.

* cited by examiner

*Primary Examiner* — Chandrahas Patel
(74) *Attorney, Agent, or Firm* — Lee & Hayes, PLLC

(57) ABSTRACT

Techniques for determining a guardband for a frequency channel based at least in part on a roll-off of a filter or a type of a filter are described herein. The filter may be a filter of a base station and the frequency channel may be used for transmissions from the base station to a mobile device. Alternatively, the filter may be a filter of a mobile device and the frequency channel may be used for transmissions from the mobile device to the base station. Further, because different filters of different mobile devices may have different roll-offs or types of filters, different guardbands may be determined for different mobile devices communicating over a same frequency channel. Upon determining the guardband, a base station may select a subcarrier based at least in part on the determined guardband.

16 Claims, 6 Drawing Sheets

FILTER-BASED GUARDBAND DETERMINATION AND SUBCARRIER SELECTION

BACKGROUND

Mobile devices engage in wireless communication over radio frequency (RF) spectrums known as channels. When initiating a wireless connection with a base station of a telecommunication network, the mobile device may listen at a given channel for downlink communications. As used herein, a downlink communication is a transmission from a base station to a mobile device. The mobile device may also receive an assignment of a subcarrier from the base station. The subcarrier is a part of a channel. For example, if a channel comprises an RF spectrum, the subcarrier is a part of that spectrum allocated for uplink communications of the mobile device. As used herein, an uplink communication is a transmission from a mobile device to a base station.

Both mobile devices and base stations incorporate filters in their radios to prevent interference with other channels. Different types of filters have different limitations, some with sharper roll-offs than others. In general, the sharper the roll-off of a filter, the less likely it will be that transmissions from a radio with that filter will interfere with an adjacent channel. Adjacent channel interference is also dealt with through the use of guardbands. Guardbands are reserved parts of an RF spectrum comprising a channel at each end of that RF spectrum. Base stations will not use or assign carriers or subcarriers in the guardbands. Thus, even when a mobile device or base station has a poor roll-off, no adjacent channel interference will occur. As filters continue to improve, however, the size of the guardbands may be needlessly large, resulting in underutilized RF spectrum and artificial congestion.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

This disclosure describes, in part, techniques for determining a guardband for a frequency channel based at least in part on a roll-off of a filter or a type of a filter. For example, a base station configured to implement the techniques may determine guardband for a frequency channel used for transmissions from the base station to a mobile device based at least in part on the roll-off or filter type of a filter of the base station. Further, the base station configured to implement the techniques may determine guardband for a frequency channel used for transmissions from a mobile device to the base station based at least in part on the roll-off or filter type of the filter of the mobile device. In some embodiments, each guardband may be specific to a mobile device, and the base station may determine two different guardbands for two different mobile devices with differing roll-offs or filter types for their filters. Upon determining a guardband, the base station may select a subcarrier based at least in part on the determined guardband. For example, the base station may select a subcarrier for transmissions from a mobile device to the base station based at least in part on the guardband determined for that mobile device. Upon selecting a subcarrier, the base station may instruct the mobile device to use the selected subcarrier.

In various embodiments, a mobile device may be configured to determine the roll-off or filter type of its filter and to provide an indication of that roll-off or filter type to a base station. The mobile device may also be configured to receive instructions from the base station, such as instructions to listen on a certain spectrum for a frequency channel or instructions to use a specific subcarrier for transmissions from the mobile device to the base station.

Example Environment

Figure 1:
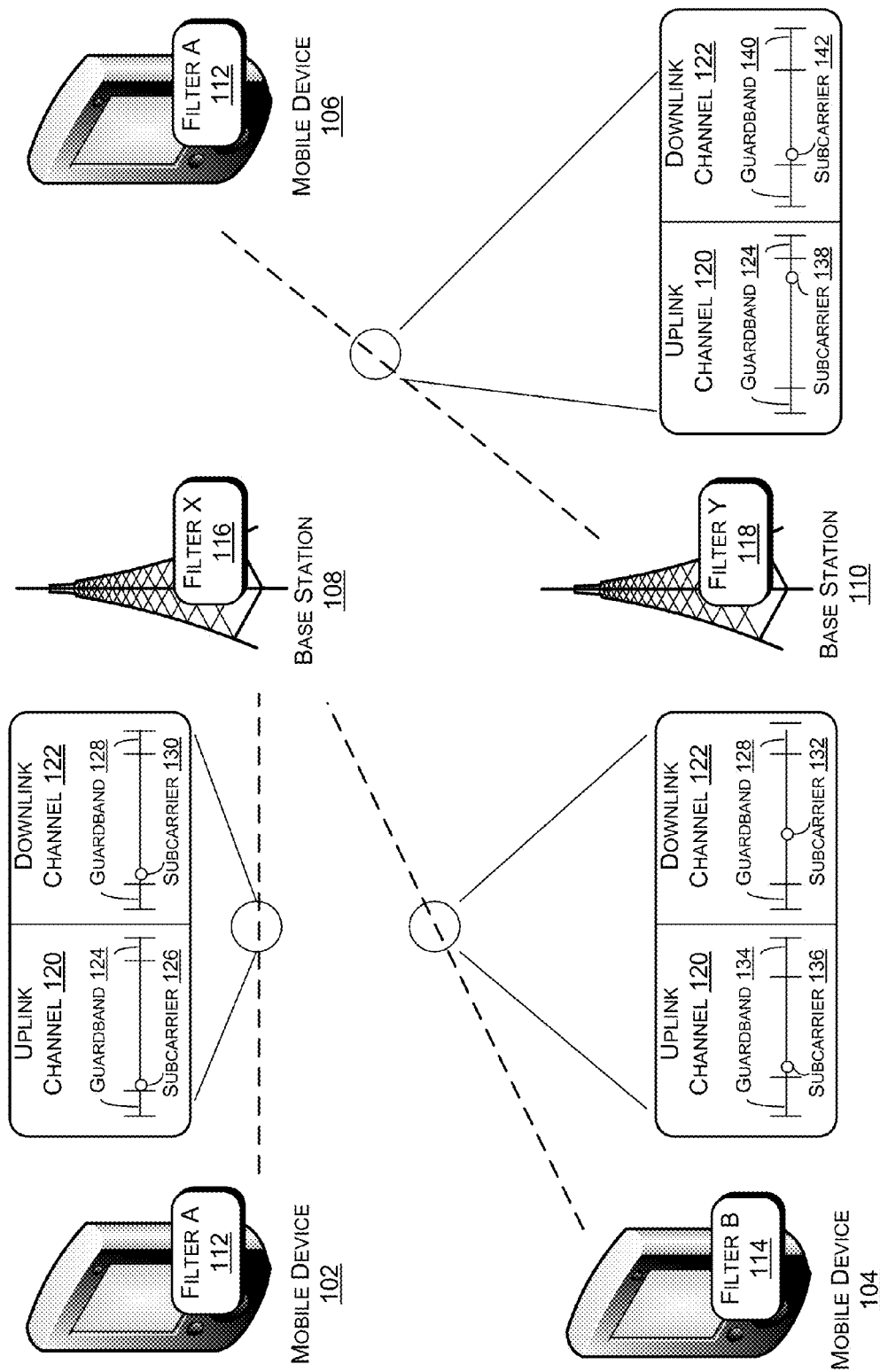
FIG. 1 illustrates an example environment including multiple mobile devices communicating with multiple base stations. The mobile devices and base stations utilize varying filters and are, accordingly, associated with different guardbands.

FIG. 1 illustrates an example environment including multiple mobile devices communicating with multiple base stations. The mobile devices and base stations utilize varying filters and are, accordingly, associated with different guardbands. As illustrated, mobile devices 102-106 may communicate with base stations 108-110 of a wireless network, such as a telecommunication network. The mobile devices 102-106 have different radio filters 112-114, and the base stations 108-110 also have different radio filters 116-118. The base stations 108-110 determine different guardbands respectively associated with the different radio filters and apply each of those guardbands to either an uplink channel 120 or a downlink channel 122. The base stations 108-110 then select subcarriers or portions of RF spectrum in a channel 120-122 based on the determined guardbands.

Figure 2:
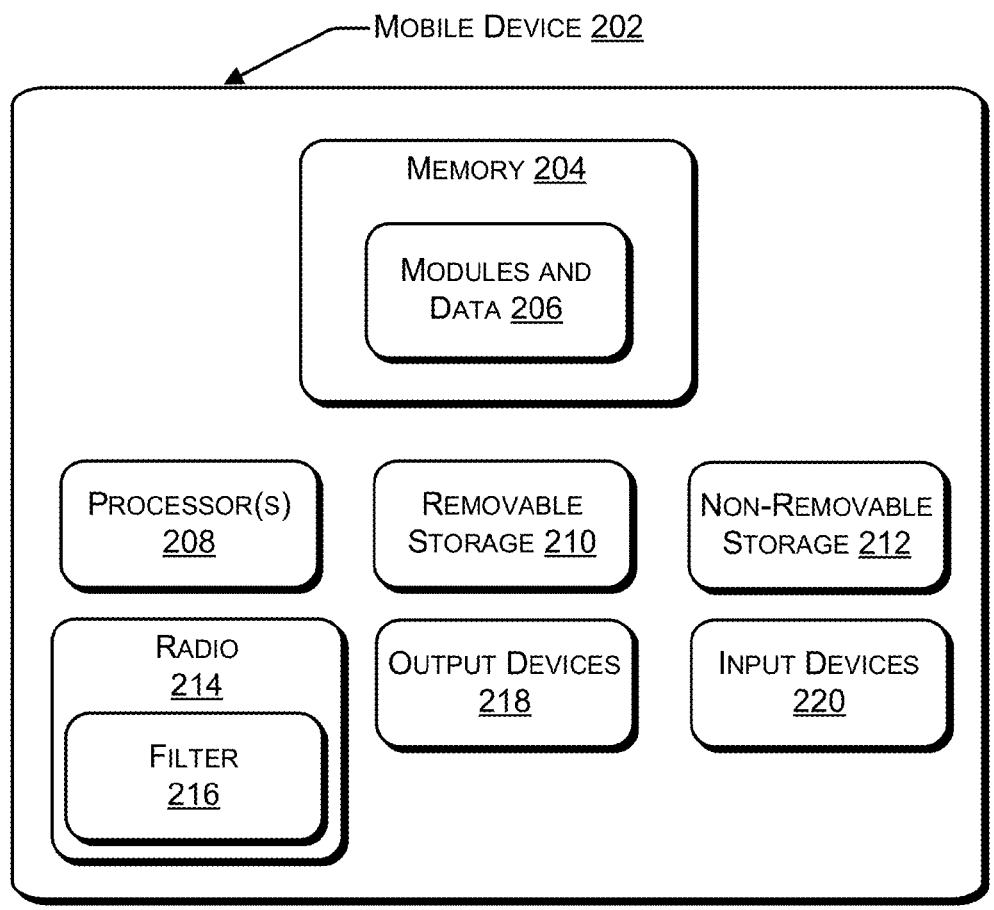
FIG. 2 illustrates a component level view of a telecommunication device.

In various embodiments, the mobile devices 102, 104, and 106 may each be any sort device capable of cellular or wireless network communication, such as a cellular phone, a tablet computer, a personal digital assistant (PDA), a personal computer (PC), a laptop computer, a media center, a work station, etc. The mobile devices 102, 104, and 106 may each be associated with a subscription to telecommunication services of a network operator of a telecommunication network associated with the base stations 108 and 110. Each of the mobile devices 102, 104, and 106 may have one or more radios, each radio equipped with a radio filter such as radio filter A 112 or radio filter B 114, the radios being used for wirelessly sending communications to and receiving communications from the base stations 108-110. An example mobile device 102-106 is illustrated in FIG. 2 and described below with reference to that figure.

Figure 3:
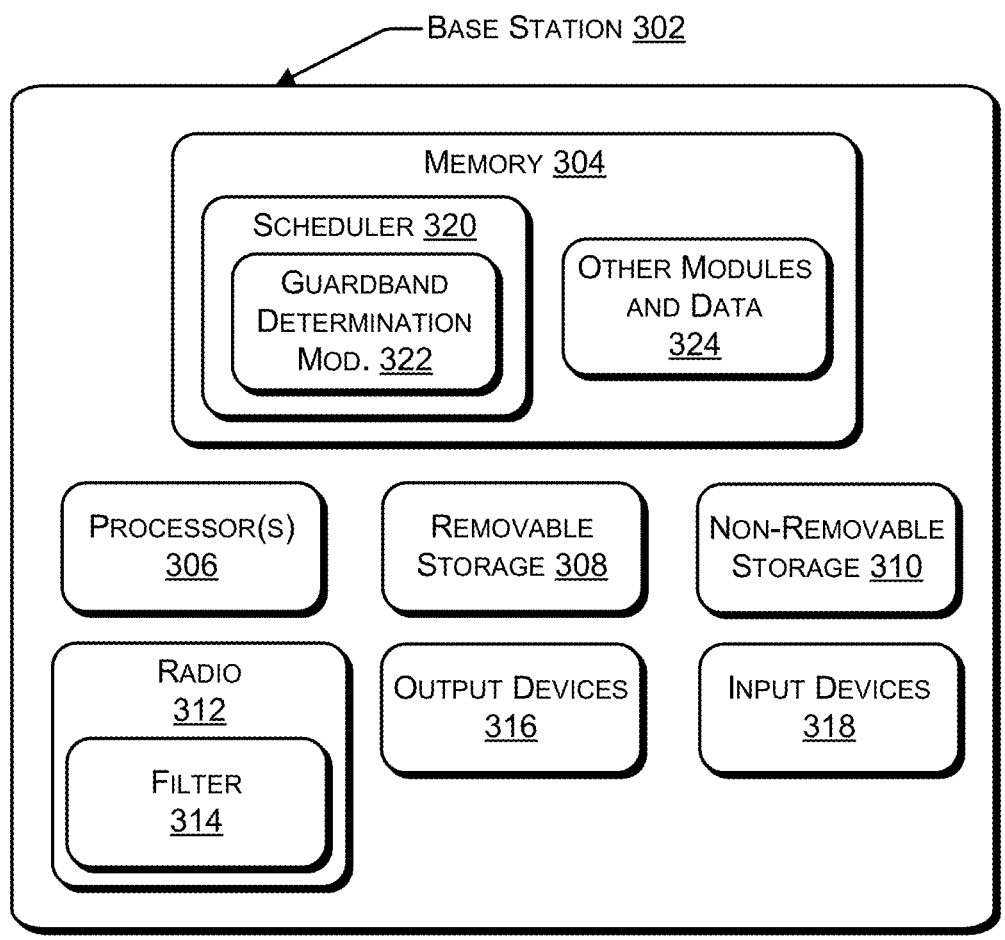
FIG. 3 illustrates a component level view of a base station equipped with a guardband determination module that determines a guardband based on a filter roll-off or filter type and a scheduler that selects a subcarrier in accordance with that determination.

In various embodiments, the base stations 108 and 110 may each be or include a server or server farm, multiple, distributed server farms, a mainframe, a work station, a personal computer (PC), a laptop computer, a tablet computer, an embedded system, or any other sort of device or devices. The base stations 108 and 110 may be any sort of base stations of a wireless network or telecommunication network, such as base stations, nodeBs, eNodeBs, or other access points. Each base station 108 and 110 may have one or more radios, each radio equipped with a radio filter such as radio filter X 116 or radio filter Y 118, the radios being used for wirelessly sending and receiving communications from mobile devices 102-106. The base stations may also be connected to core network components of a telecommunication network. An example base station 108-110 is illustrated in FIG. 3 and is described in greater detail below with reference to that figure.

In some embodiments, filter A 112 and filter B 114 are radio filters of mobile devices 102-106. Filter A 112 and filter B 114 may each be used to transmit RF communications over the subcarrier assigned to their respective mobile device 102, 104, or 106 by filtering out other parts of the spectrum of the channel on which the radio of the mobile device 102, 104, or 106 is transmitting. Further, filter A 112 and filter B 114 may each be an adjacent channel interference filter designed to reduce interference with adjacent channels. Such a filter may have a sharp roll-off.

In some embodiments, filter X 116 and filter Y 118 are respectively radio filters of base stations 108 and 110. Filter X 116 and filter Y 118 may each be used to transmit RF communications over the subcarrier or part of spectrum selected by their respective base stations 108 and 110 by filtering out other parts of the spectrum of the channel on which the radio of the base stations 108 and 110 is transmitting. Further, filter X 116 and filter Y 118 may each be an adjacent channel interference filter designed to reduce interference with adjacent channels. Such a filter may have a sharp roll-off.

In various embodiments, uplink channel 120 is a RF spectrum used by mobile devices 102-106 for transmissions from the mobile devices 102-106 to the base stations 108-110. Downlink channel 122 is an RF spectrum used by the base stations 108-110 for transmissions from the base stations 108-110 to the mobile devices 102-106. Both the uplink channel 120 and the downlink channel 122 may be super high frequency channels in the range of 3 GHz to 30 GHz. In other embodiments, either or both of the uplink channel 120 or the downlink channel 122 may occupy part of a different frequency range.

FIG. 1 illustrates each of the uplink channel 120 and the downlink channel 122 as a straight line divided into three sections. The two outer sections are guardbands, defined by a guardband mask, and the central portion is a part of the channel available for subcarrier selection. In some embodiments, either or both of the base stations 108 or 110 may maintain a default guardband for a channel. The default guardband may be applied to the channel by a guardband mask when a filter type or roll-off is unavailable. For example, if the channel is a 20 MHz channel, the base station 108 or 110 may maintain default guardbands of 1 MHz each and a central, available portion of 18 MHz.

As illustrated in FIG. 1, the mobile device 102 is wirelessly connected to the base station 108 using uplink channel 120 to transmit communications to the base station 108 and downlink channel 122 to receive communications from the base station 108. The mobile device 102 may provide an indication of the type or roll-off of its radio filter A 112 to the base station 108. For example, the mobile device 102 may provide the indication in a specific field of a registration or connection message. Upon receiving the indication, the base station 108 may determine a guardband 124 to apply to the uplink channel 120 for the mobile device 102. In some embodiments, determining the guardband 124 may involve comparing the filter type or roll-off to one or more criteria or proportioning the guardband 124 based on the roll-off. The base station 108 then adjusts the guardband mask based on the comparing or proportioning After adjusting the guardband mask, the base station 108 utilizes the guardband mask to determine an available part of the uplink channel 120 and a scheduler of the base station 108 selects a subcarrier 126 for the mobile device 102 within the available portion. The base station 108 then instructs the mobile device 102 to utilize the subcarrier 126 for transmissions over the uplink channel 120.

For the downlink channel 122 connecting the base station 108 to the mobile device 102, the base station 108 may determine the type or roll-off of the radio filter X 116 of the base station 108 and determine a guardband 128 for the downlink channel 122 based on the type of filter or roll-off. In some embodiments, the determined guardband 128 is not specific to mobile device 104 but, rather, is applicable to all connections over the downlink channel 122 between the base station 108 and mobile devices, such as mobile devices 102 and 104. In some embodiments, determining the guardband 128 may involve comparing the filter type or roll-off to one or more criteria or proportioning the guardband 128 based on the roll-off. The base station 108 then adjusts the guardband mask based on the comparing or proportioning After adjusting the guardband mask, the base station 108 utilizes the guardband mask to determine an available part of the downlink channel 122 and selects a subcarrier 130/part of the available spectrum for the mobile device 102 within the available portion. The base station may 108 also determine subcarriers or parts of available spectrum to use for other mobile devices as well. For example, the base station 108 utilizes the guardband mask to determine an available part of the downlink channel 122 and selects a subcarrier 132/part of the available spectrum for the mobile device 104 within the available portion. The base station then uses the subcarriers 130-132/parts of spectrum for transmissions to the mobile devices 102 and 104.

In various embodiments, the mobile device 104 is wirelessly connected to the base station 108 using uplink channel 120 to transmit communications to the base station 108 and downlink channel 122 to receive communications from the base station 108. The mobile device 104 may provide an indication of the type or roll-off of its radio filter B 114 to the base station 108. For example, the mobile device 104 may provide the indication in a specific field of a registration or connection message. Upon receiving the indication, the base station 108 may determine a guardband 134 to apply to the uplink channel 120 for the mobile device 104. In some embodiments, determining the guardband 134 may involve comparing the filter type or roll-off to one or more criteria or proportioning the guardband 134 based on the roll-off. The base station 108 then adjusts the guardband mask based on the comparing or proportioning After adjusting the guardband mask, the base station 108 utilizes the guardband mask to determine an available part of the uplink channel 120 and a scheduler of the base station 108 selects a subcarrier 136 for the mobile device 104 within the available portion. The base station 108 then instructs the mobile device 104 to utilize the subcarrier 136 for transmissions over the uplink channel 120.

Because the roll-off or filter type of radio filter B 114 may differ from that of radio filter A 112, the guardband 134 may be larger or smaller than the guardband 124. For example, radio filter A 112 may have a sharper roll-off than radio filter B 114, and based on that sharper roll-off the base station may determine a smaller guardband 124 for the mobile device 102 and its radio filter A 112 (e.g., a guardband 124 of 0.5 MHz) and a slightly larger guardband 134 for mobile device 104 and its radio filter B 114 (e.g., a guardband 134 of 0.75 MHz). Because the guardbands 124 and 134 differ, the base station 108 may select a subcarrier for a mobile device (e.g., subcarrier 126 for mobile device 102) that is not in the guardband for that mobile device but which may be in the guardband for a different mobile device. Continuing with the previous example, if guardband 124 is 0.5 MHz and guardband 134 is 0.75 MHz, the subcarrier 126 may be assigned between the boundary of the 0.5 MHz guardband 124 and the boundary of the 0.75 MHz guardband 134. In other embodiments, different radio filters 112-114 may be associated with a same guardband if their different roll-offs are both less than or more than a threshold or if their different filter types belong to a same category.

As illustrated in FIG. 1, the mobile device 106 may have a radio filter A 112 with the same roll-off or type as the radio filter A 112 of mobile device 102. Consequently, when mobile device 106 provides an indication of the roll-off or type of its radio filter A 112 to the base station 110, the base station 110 determines a same guardband 124 as base station 108 determined for mobile device 102. Base stations 108-110 may determine this same guardband 124 because they may be applying a common policy of a network operator of the telecommunication network with which they are associated. Because mobile devices 102 and 106 will be transmitting on a same uplink channel 120, however, the scheduler of the base station 110 will select a different subcarrier 138 than the subcarrier 126 selected for mobile device 102 by the scheduler of base station 108. The base station 110 then instructs the mobile device 106 to utilize the subcarrier 138.

In various embodiments, for the downlink channel 122 connecting the base station 110 to the mobile device 106, the base station 110 may determine the type or roll-off of the radio filter Y 118 of the base station 110 and determine a guardband 140 for the downlink channel 122 based on the type of filter or roll-off. In some embodiments, the determined guardband 140 is not specific to mobile device 106 but, rather, is applicable to all connections over the downlink channel 122 between the base station 110 and mobile devices, such as mobile device 106. In some embodiments, determining the guardband 140 may involve comparing the filter type or roll-off to one or more criteria or proportioning the guardband 140 based on the roll-off. The base station 110 then adjusts the guardband mask based on the comparing or proportioning. After adjusting the guardband mask, the base station 110 utilizes the guardband mask to determine an available part of the downlink channel 122 and selects a subcarrier 142/part of the available spectrum for the mobile device 106 within the available portion. The base station may 110 also determines subcarriers or parts of available spectrum to use for other mobile devices as well. The base station then uses the subcarrier 142/part of available spectrum for transmissions to the mobile device 106.

Because the roll-off or filter type of radio filter Y 118 may differ from that of radio filter X 116, the guardband 140 may be larger or smaller than the guardband 128. For example, radio filter X 116 may have a sharper roll-off than radio filter Y 118, and based on that sharper roll-off the base station 108 may determine a smaller guardband 128 itself and its radio filter X 116 (e.g., a guardband 128 of 0.4 MHz) and base station 110 may determine a slightly larger guardband 140 for itself and its radio filter Y 118 (e.g., a guardband 140 of 0.6 MHz). Because the guardbands 128 and 140 differ, the base station 108 may select a subcarrier or part of spectrum (e.g., subcarrier 130) that is not in the guardband for base station 108 but which may be in the guardband for a different base station with a different radio filter. Continuing with the previous example, if guardband 128 is 0.4 MHz and guardband 140 is 0.6 MHz, the subcarrier 128 may be assigned between the boundary of the 0.4 MHz guardband 128 and the boundary of the 0.6 MHz guardband 140. In other embodiments, different radio filters 116-118 may be associated with a same guardband if their different roll-offs are both less than or more than a threshold or if their different filter types belong to a same category.

Example Mobile Device

FIG. 2 illustrates a component level view of a mobile device. As illustrated, the mobile device 202 comprises a system memory 204 storing modules and data 206. Also, the mobile device 202 includes processor(s) 208, a removable storage 210, a non-removable storage 212, a radio 214, a filter 216 for the radio 214, output device(s) 218, and input device(s) 220.

In various embodiments, system memory 204 is volatile (such as RAM), non-volatile (such as ROM, flash memory, etc.) or some combination of the two. The modules or data 206 stored in the system memory 204 may comprise any sort of applications or platform components of the mobile device 202, as well as data associated with such applications or platform components.

For example, the modules or data 206 may include one or more modules that, when executed, determine a roll-off or filter type for the filter 216 and provide an indication of that roll-off or filter type to a base station, such as a base station 108 or 110. The one or more modules may provide the indication, for instance, in a specific field of a registration or connection message. The one or more modules may also, when executed, receive or retrieve instructions from a base station. Such instructions may include instructions to listen to a specified frequency range of a channel, such as the downlink channel 122. The specified frequency range may be included in the instructions and may be based on a guardband 128 or 140. Also or instead, the instructions may specify a subcarrier to use when transmitting on an uplink channel 120, such as one of the subcarriers 126, 136, or 138. Upon receiving the instructions, the one or more modules may perform the instructions (e.g., by listening to the frequency range of the channel or by utilizing the subcarrier). In some embodiments, the one or more modules may be part of or associated with a radio interface layer (RIL), which may be an RIL of a network stack and may service as an interface to the radio 214.

In some embodiments, the processor(s) 208 is a central processing unit (CPU), a graphics processing unit (GPU), or both CPU and GPU, or any other sort of processing unit.

Mobile device 202 also includes additional data storage devices (removable and/or non-removable) such as, for example, magnetic disks, optical disks, or tape. Such additional storage is illustrated in FIG. 2 by removable storage 210 and non-removable storage 212. Tangible computer-readable media may include volatile and nonvolatile, removable and non-removable media implemented in any method or technology for storage of information, such as computer readable instructions, data structures, program modules, or other data. System memory 204, removable storage 210, and non-removable storage 212 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the mobile device 202. Any such tangible computer-readable media may be part of the mobile device 202.

In some embodiments, the radio 214 includes any sort of radio known in the art. For example, radio 214 may include a radio transceiver that performs the function of transmitting and receiving RF communications via an antenna. The radio 214 may facilitate wireless connectivity between the mobile device 202 and various cell towers, base stations and/or access points, such as base station 106 or 134.

As shown in FIG. 2, the radio 214 may be associated with a filter 216. The filter 216 may be used by the radio to transmit RF communications over the subcarrier assigned to the mobile device 202 by filtering out other parts of the spectrum of the channel on which the radio 212 is transmitting. Further, the filter 216 may be an adjacent channel interference filter designed to reduce interference with adjacent channels. Such a filter may have a sharp roll-off.

In addition to radio 214, the mobile device 202 may also include a wireless communication transceiver and a near field antenna for communicating over unlicensed wireless Internet Protocol (IP) networks, such as local wireless data networks and personal area networks (e.g., Bluetooth or near field communication (NFC) networks).

In some embodiments, the output devices 218 include any sort of output devices known in the art, such as a display (e.g., a liquid crystal display), speakers, a vibrating mechanism, or a tactile feedback mechanism. Output devices 218 also include ports for one or more peripheral devices, such as headphones, peripheral speakers, or a peripheral display.

In various embodiments, input devices 220 include any sort of input devices known in the art. For example, input devices 220 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Example Base Station

FIG. 3 illustrates a component level view of a base station equipped with a guardband determination module that determines a guardband based on a filter roll-off or filter type and a scheduler that selects a subcarrier in accordance with that determination. As illustrated, the base station 302 comprises a system memory 304, processor(s) 306, a removable storage 308, a non-removable storage 310, a radio 312, a filter 314 associated with the radio 312, output device(s) 316, and input device(s) 318. The system memory 304 stores a schedule 320, which includes a guardband determination module 322, and other modules and data 324.

In various embodiments, system memory 302 is volatile (such as RAM), non-volatile (such as ROM, flash memory, etc.) or some combination of the two.

The application controller 128 is described above in detail with regard to FIG. 1. The other modules or data 304 stored in the system memory 302 may comprise any sort of applications or platform components of the network proxy device 124, as well as data associated with such applications or platform components.

In some embodiments, the processor(s) 306 is a central processing unit (CPU), a graphics processing unit (GPU), or both CPU and GPU, or any other sort of processing unit.

Base station 302 also includes additional data storage devices (removable and/or non-removable) such as, for example, magnetic disks, optical disks, or tape. Such additional storage is illustrated in FIG. 3 by removable storage 308 and non-removable storage 310. Tangible computer-readable media may include volatile and nonvolatile, removable and non-removable media implemented in any method or technology for storage of information, such as computer readable instructions, data structures, program modules, or other data. System memory 302, removable storage 308 and non-removable storage 310 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the base station 302. Any such tangible computer-readable media may be part of the base station 302.

In some embodiments, the transceivers 312 include any sort of transceivers known in the art. For example, transceivers 312 may include a radio transceiver that performs the function of transmitting and receiving radio frequency communications via an antenna. The radio 212 may facilitate wireless connectivity between the network proxy device 124 and various nodes of the telecommunication network 120 or between the network proxy device 124 and routers or other devices of the Internet 126.

In some embodiments, the radio 312 includes any sort of radio known in the art. For example, radio 312 may include a radio transceiver that performs the function of transmitting and receiving RF communications via an antenna. The radio 312 may facilitate wireless connectivity between the base station 302 and various mobile devices, such as mobile devices 102, 110, or 132.

As shown in FIG. 3, the radio 312 may be associated with a filter 314. The filter 314 may be used by the radio to transmit RF communications over a part of the spectrum utilized by the base station 302 to transmit RF communications to a mobile device by filtering out other parts of the spectrum of the channel on which the radio 312 is transmitting. Further, the filter 314 may be an adjacent channel interference filter designed to reduce interference with adjacent channels. Such a filter may have a sharp roll-off.

In addition to radio 312, the base station 302 may also include a wireless communication transceiver and a near field antenna for communicating over unlicensed wireless Internet Protocol (IP) networks, such as local wireless data networks and personal area networks (e.g., Bluetooth or near field communication (NFC) networks).

In some embodiments, the output devices 316 include any sort of output devices known in the art, such as a display (e.g., a liquid crystal display), speakers, a vibrating mechanism, or a tactile feedback mechanism. Output devices 316 also include ports for one or more peripheral devices, such as headphones, peripheral speakers, or a peripheral display.

In various embodiments, input devices 318 include any sort of input devices known in the art. For example, input devices 318 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

In various embodiments, the scheduler 320 stored in memory 304 may be any sort of scheduler of a base station that selects subcarriers or parts of spectrum for use by the base station 302 or a mobile device. The scheduler 320 may either check a guardband setting or utilize a guardband mask. The guardband setting or guardband mask may be specific to a channel and filter 216 (e.g., downlink channel 122) or may even be specific to a mobile device. The scheduler 320 applies the guardband setting or guardband mask to determine an available part of the channel and then selects a subcarrier or part of spectrum in the available part of the channel. If the selected subcarrier is a subcarrier for an uplink channel, then the scheduler or another component of the base station 302 may notify the mobile device of the subcarrier that the mobile device is to utilize. In some embodiments, the scheduler 320 may also utilize the guardband setting or guardband mask to determine a frequency range for a downlink channel and may instruct a mobile device to listen to that frequency range for communications from the base station 302. In further embodiments, the scheduler 320 may also automatically reassign a mobile device to a different subcarrier based on new connections to additional mobile devices or loss of connection with other mobile device(s).

As shown in FIG. 3, the guardband determination module 322 may be a component of the scheduler 320. In other embodiments, the guardband determination module 322 may be a separate module from the scheduler 320. The guardband determination module 322 is configured to determine a roll-off or a filter type of the filter 314. Upon determining the roll-off or filter type, the guardband determination module 322 may compare the roll-off or filter type to one or more criteria. Such criteria may be specified by a policy of a network operator associated with the base station 302 or by a telecommunication standard. The criteria may include, for example, a roll-off threshold or categories of filter types and associated guardbands. The guardband determination module 322 then determines a guardband for a downlink channel, such as downlink channel 122, based on the comparison of the roll-off or filter type of the filter 314 to the criteria. For example, the criteria may specify that the guardband is to be proportioned to the roll-off, and the guardband determination module 322 may determine the guardband based on that criteria and the roll-off. After determining the guardband for the downlink channel, the base station 302 sets a guardband setting or modifies a guardband mask for use by the scheduler 320. In some embodiments, the base station 302 may communicate on different downlink channels and may determine corresponding, different guardbands for the different channels. Alternatively or additionally, the base station 302 may have additional radio and filters based radio 312 and filter 314 and may determine a guardband for each combination of a filter and a downlink channel.

In various embodiments, the guardband determination module 322 also determines guardbands for uplink channels, and may determine a guardband for each mobile device communicating over a given uplink channel. The guardband determination module 322 may receive or retrieve an indication of a roll-off or filter type of a filter of a mobile device (e.g., in a specific field of a registration or connection message). Upon receiving or retrieving the indication, the guardband determination module 322 may compare the roll-off or filter type to one or more criteria. Such criteria may be specified by a policy of a network operator associated with the base station 302 or by a telecommunication standard. The criteria may include, for example, a roll-off threshold or categories of filter types and associated guardbands. The guardband determination module 322 then determines a guardband for a combination of an uplink channel, such as uplink channel 120, and a mobile device, such as mobile device 102, based on the comparison of the roll-off or filter type of the filter of that mobile device to the criteria. For example, the criteria may specify that the guardband is to be proportioned to the roll-off, and the guardband determination module 322 may determine the guardband based on that criteria and the roll-off. After determining the guardband for the combination of uplink channel and mobile device, the base station 302 sets a guardband setting or modifies a guardband mask for use by the scheduler 320. The guardband setting or guardband mask may be specific to the mobile device for which the guardband was determined.

The other modules or data 324 stored in the system memory 304 may comprise any sort of applications or platform components of the base station 302, as well as data associated with such applications or platform components.

Example Processes

Figure 4:
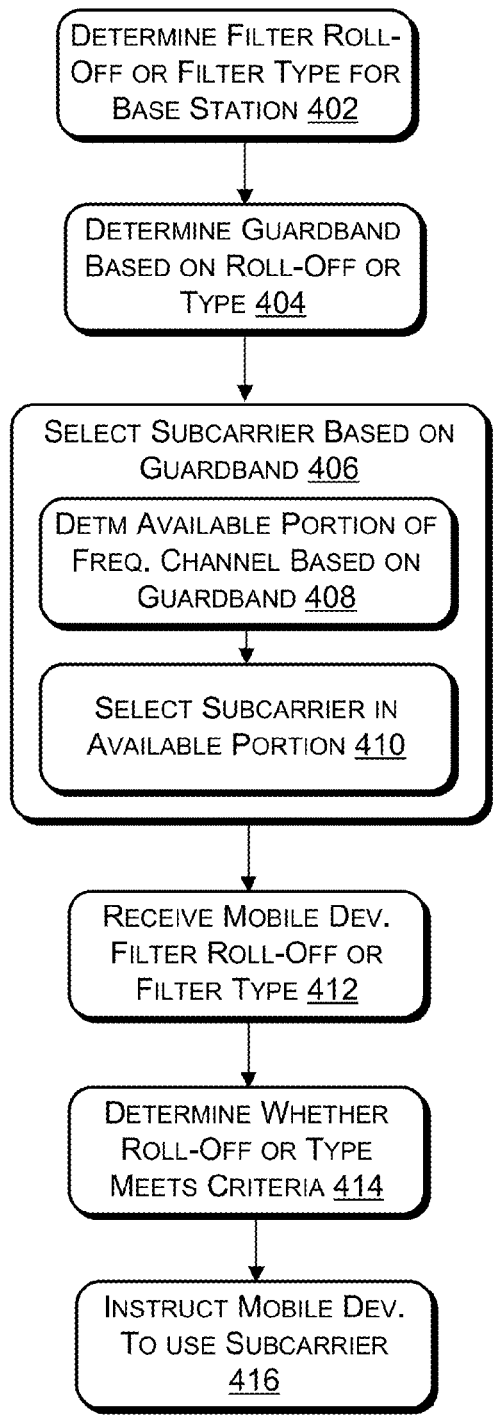
FIG. 4 illustrates an example process performed by a base station, the process including determining a guardband for a frequency channel based on a roll-off or type of filter of the base station and selecting a subcarrier based at least in part on the determined guardband.
Figure 5:
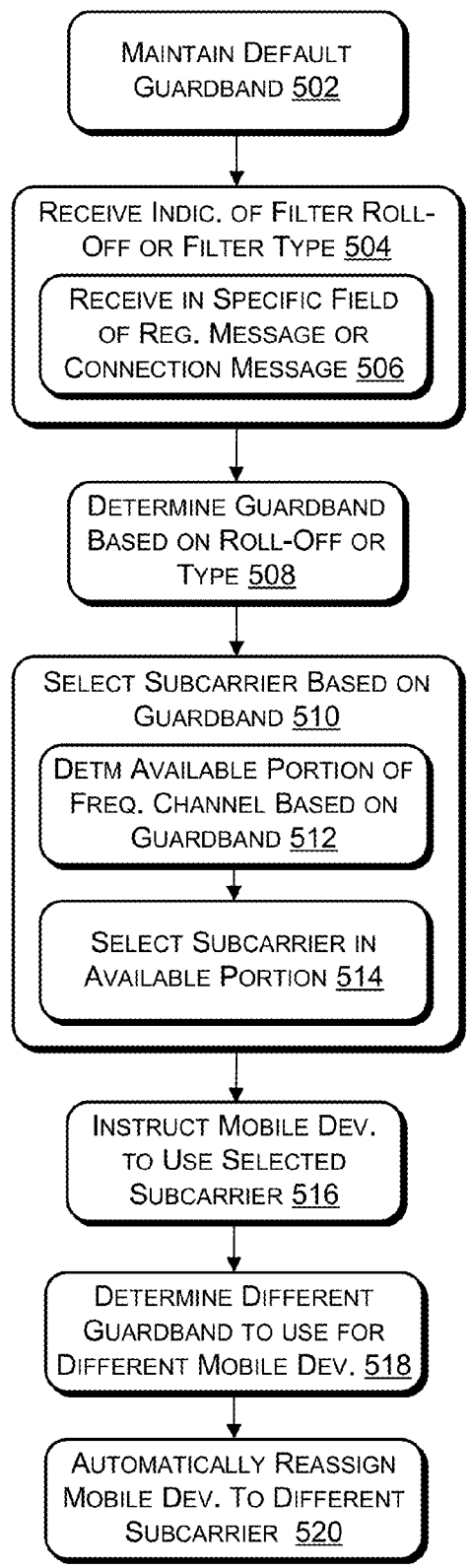
FIG. 5 illustrates an example process performed by a base station, the process including determining a guardband for a frequency channel based on a roll-off or type of filter of a mobile device, selecting a subcarrier based at least in part on the determined guardband, and instructing the mobile device to use the subcarrier.
Figure 6:
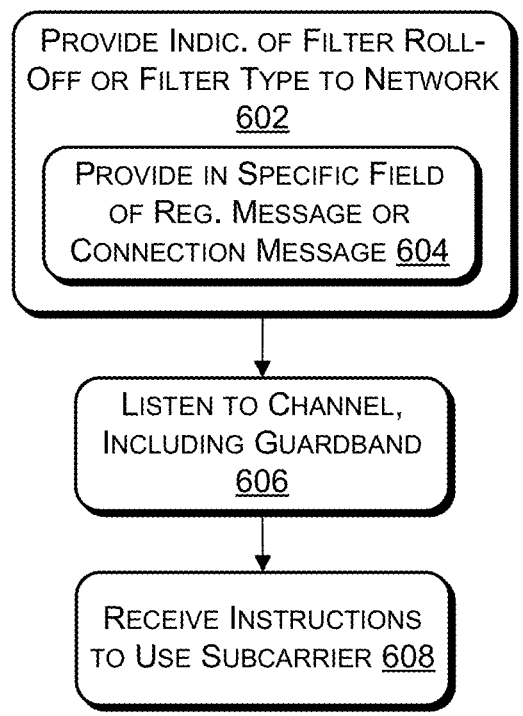
FIG. 6 illustrates an example process performed by a mobile device, the process including providing an indication of a roll-off or type of filter of the mobile device to a base station and receiving, from the base station, instructions to utilize a subcarrier.

FIGS. 4-6 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 illustrates an example process performed by a base station, the process including determining a guardband for a frequency channel based on a roll-off or type of filter of the base station and selecting a subcarrier based at least in part on the determined guardband. The process includes, at 402, determining, by a base station, a roll-off of a filter of the base station or a type of the filter.

At 404, the base station then determines a guardband for a frequency channel based at least in part on the roll-off or the type of the filter. This determination may involve determining whether the filter roll-off or the filter type meets one or more criteria. Such criteria may be specified by a policy of the telecommunication network or by a telecommunication standard. Also, the size of the determined guardband may be proportional to the magnitude of the roll-off.

At 406, the base station selects a subcarrier for transmissions from the base station to a mobile device based at least in part on the determined guardband for the frequency channel. No subcarriers are selected in the guardband portion of a channel although, in some embodiments, the selected subcarrier may be associated with a part of spectrum maintained as a guardband in the absence of a filter roll-off or a filter type meeting the one or more criteria. The selecting at 406 may include, at 408, determining a portion of a channel to be available for subcarrier selection based at least in part on the determined guardband and, at 410, selecting a subcarrier within the available portion of the channel.

At 412, the base station may receive, from a mobile device, an indication of a roll-off of a filter of the mobile device or a type of the filter of the mobile device. At 414, the base station may determine whether the roll-off of the filter of the mobile device or the type of the filter of the mobile device meets one or more criteria and determine a guardband accordingly. At 416, the base station instructs the mobile device to utilize a subcarrier for transmissions from the mobile device to the base station based at least on the determined guardband. In some embodiments, the operations shown at blocks 412-416 may occur prior to, concurrently with, or after the operations shown at blocks 402-410.

FIG. 5 illustrates an example process performed by a base station, the process including determining a guardband for a frequency channel based on a roll-off or type of filter of a mobile device, selecting a subcarrier based at least in part on the determined guardband, and instructing the mobile device to use the subcarrier. The process includes, at 502, maintaining, by a base station, a default guardband used for a mobile device when either or both of a roll-off or a type of filter of that mobile device is unavailable.

At 504, the base station receives from a mobile device, an indication of a roll-off of a filter of the mobile device or a type of the filter. The receiving the indication at 504 may comprise, at 506, receiving the indication in a specific field of a registration or connection message from the mobile device to the base station.

At 508, the base station determines a guardband for a frequency channel based at least in part on the roll-off or the type of the filter of the mobile device. This determination may involve determining whether the filter roll-off or the filter type of the mobile device meets one or more criteria. Such criteria may be specified by a policy of the telecommunication network or by a telecommunication standard. Also, the size of the determined guardband may be proportional to the magnitude of the roll-off.

At 510, the base station selects a subcarrier for transmissions from the mobile device to the base station based at least in part on the determined guardband for the frequency channel. No subcarriers are selected in the guardband portion of a channel although, in some embodiments, the selected subcarrier may be associated with a part of spectrum maintained as a guardband in the absence of a filter roll-off or a filter type meeting the one or more criteria. The selecting at 510 may include, at 512, determining a portion of a channel to be available for subcarrier selection based at least in part on the determined guardband and, at 514, selecting a subcarrier within the available portion of the channel.

At 516, the base station instructs the mobile device to utilize the selected subcarrier.

At 518, the base station then determines a different guardband to use for a different mobile device based on a roll-off or type of filter of the different mobile device. The selected subcarrier for the mobile device may occupy a part of the channel associated with the different guardband of the different mobile device.

At 520, the base station automatically reassigns the mobile device to a different subcarrier based on an addition or a loss of a connection with another mobile device.

FIG. 6 illustrates an example process performed by a mobile device, the process including providing an indication of a roll-off or type of filter of the mobile device to a base station and receiving, from the base station, instructions to utilize a subcarrier. The process includes, at 602, providing, by a mobile device, an indication of a roll-off of a filter of the mobile device or a type of the filter to a base station of a telecommunication network. The providing at 602 may include, at 604, providing the indication of the roll-off or the type of the filter in a specific field of a registration message or a connection message.

At 606, the mobile device listens to a channel, including the guardband portion of the channel, in response to instructions from the base station to tune to channel.

At 608, the mobile device receives instructions from the base station to utilize a subcarrier on a frequency range of a channel for transmissions from the mobile device to the base station. The frequency range is used for mobile devices that have roll-offs or types of filters which meet one or more criteria and is reserved as a guardband portion of the channel applicable to other mobile devices that have roll-offs or types of filters which do not meet one or more criteria.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A base station comprising:
   one or more processors;
   a radio communicatively coupled to the one or more processors, the radio including a filter associated with at least one of a filter type and a roll-off;
   a guardband determination module configured to be operated by the one or more processors to perform operations including:
      determining the roll-off of the filter of the base station or the filter type of the filter of the base station;
      determining a first guardband for a first frequency channel based at least in part on the roll-off of the filter of the base station or the filter type of the filter of the base station;
      receiving, from a mobile device, an indication of a roll-off of a filter of the mobile device or a type of the filter of the mobile device; and
      determining a second guardband for a second frequency channel based at least in part on the roll-off of the filter of the mobile device or the type of the filter of the mobile device; and
   a scheduler, wherein the guardband determination module is a component of the scheduler, and the scheduler is configured to be operated by the one or more processors to perform operations including:
      selecting a first subcarrier for transmissions from the base station to the mobile device based at least in part on the determined first guardband for the first frequency channel;
      selecting a second subcarrier for transmissions from the mobile device to the base station based at least in part on the determined second guardband for the second frequency channel; and
      instructing the mobile device to utilize the selected second subcarrier.

2. The base station of claim 1, wherein the filter is an adjacent channel interference filter.

3. The base station of claim 1, wherein the second guardband is different for other mobile devices that have other roll-offs or other types of filters.

4. The base station of claim 1, wherein at least one of the first guardband or the second guardband are determined based at least in part on a policy of a telecommunication network or a telecommunication standard.

5. The base station of claim 1, wherein the guardband determination module is configured to be operated by the one or more processors to determine a different guardband to use for a different mobile device based on a roll-off or type of filter of the different mobile device.

6. The base station of claim 5, wherein the selected second subcarrier occupies a part of the second frequency channel associated with the different guardband.

7. The base station of claim 1, wherein receiving the indication comprises receiving the indication in a specific field of a registration message or a connection message from the mobile device to the base station.

8. The base station of claim 1, wherein the scheduler is configured to be operated by the one or more processors to automatically reassign the mobile device to a different subcarrier based on an addition or a loss of a connection with another mobile device.

9. One or more non-transitory computer-readable media having stored thereon a plurality of computer-executable instructions which, when executed by a base station of a telecommunication network, cause the base station to perform operations comprising:
    determining a roll-off of a filter of the base station or a type of the filter;
    determining a guardband for a frequency channel based at least in part on the roll-off or the type of the filter; and
    selecting a subcarrier for transmissions from the base station to a mobile device based at least in part on the determined guardband for the frequency channel, wherein the selecting comprises determining a portion of a channel to be available for subcarrier selection based at least in part on the determined guardband and selecting the subcarrier within the available portion of the channel.

10. The one or more non-transitory computer-readable media of claim 9, wherein the selected subcarrier is associated with a part of spectrum maintained as a guardband in the absence of a filter roll-off or a filter type meeting one or more criteria.

11. The one or more non-transitory computer-readable media of claim 9, wherein the operations further comprise:
    receiving, from a mobile device, an indication of a roll-off of a filter of the mobile device or a type of the filter of the mobile device;
    determining whether the roll-off of the filter of the mobile device or the type of the filter of the mobile device meets one or more criteria;
    determining a guardband for a different frequency channel based at least in part on whether the roll-off of the filter of the mobile device or the type of the filter of the mobile device meets the one or more criteria; and
    instructing the mobile device to utilize a subcarrier for transmissions from the mobile device to the base station, the subcarrier for transmissions from the mobile device being selected based at least in part on the determined guardband for the different frequency channel.

12. The one or more non-transitory computer-readable media of claim 9, wherein no subcarriers are selected in the guardband portion of a channel.

13. A method implemented by a base station of a telecommunication network, comprising:
    determining a roll-off of a filter of the base station or a type of the filter;
    determining a guardband for a frequency channel based at least in part on the roll-off or the type of the filter; and
    selecting a subcarrier for transmissions from the base station to a mobile device based at least in part on the determined guardband for the frequency channel, wherein the selecting comprises determining a portion of a channel to be available for subcarrier selection based at least in part on the determined guardband and selecting the subcarrier within the available portion of the channel.

14. The method of claim 13, wherein the selected subcarrier is associated with a part of spectrum maintained as a guardband in the absence of a filter roll-off or a filter type meeting one or more criteria.

15. The method of claim 13, further comprising:
    receiving, from a mobile device, an indication of a roll-off of a filter of the mobile device or a type of the filter of the mobile device;
    determining whether the roll-off of the filter of the mobile device or the type of the filter of the mobile device meets one or more criteria;
    determining a guardband for a different frequency channel based at least in part on whether the roll-off of the filter of the mobile device or the type of the filter of the mobile device meets the one or more criteria; and
    instructing the mobile device to utilize a subcarrier for transmissions from the mobile device to the base station, the subcarrier for transmissions from the mobile device being selected based at least in part on the determined guardband for the different frequency channel.

16. The method of claim 13, wherein no subcarriers are selected in the guardband portion of a channel.

* * * * *